US011413952B2

(12) United States Patent
Keller et al.

(10) Patent No.: US 11,413,952 B2
(45) Date of Patent: Aug. 16, 2022

(54) HYBRID MODULE AND A DRIVE ARRANGEMENT FOR A MOTOR VEHICLE

(71) Applicant: Schaeffler Technologies AG & Co. KG, Herzogenaurach (DE)

(72) Inventors: Aurelie Keller, Herrlisheim (FR); Dirk Reimnitz, Bühl (DE); Michael Baumann, Lauf (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 933 days.

(21) Appl. No.: 16/336,127

(22) PCT Filed: Apr. 25, 2017

(86) PCT No.: PCT/DE2017/100337
§ 371 (c)(1),
(2) Date: Mar. 25, 2019

(87) PCT Pub. No.: WO2017/186227
PCT Pub. Date: Nov. 2, 2017

(65) Prior Publication Data
US 2020/0039340 A1 Feb. 6, 2020

(30) Foreign Application Priority Data

Apr. 27, 2016 (DE) .......................... 102016207104.1
Nov. 23, 2016 (DE) .......................... 102016223135.9

(51) Int. Cl.
*B60K 6/40* (2007.10)
*B60K 6/26* (2007.10)
(Continued)

(52) U.S. Cl.
CPC ................. *B60K 6/40* (2013.01); *B60K 6/26* (2013.01); *B60K 6/30* (2013.01); *B60K 6/387* (2013.01);
(Continued)

(58) Field of Classification Search
CPC ... B60K 6/40; B60K 6/26; B60K 6/30; B60K 6/387; B60K 2006/4816; H02K 7/088; H02K 7/108; B60Y 2200/92
See application file for complete search history.

(56) References Cited

U.S. PATENT DOCUMENTS

2011/0148354 A1* 6/2011 Wenger ..................... B60K 6/36
320/109
2013/0291374 A1* 11/2013 Ohnemus ................. B60K 6/48
29/598

(Continued)

FOREIGN PATENT DOCUMENTS

DE 102014209833 A1 11/2015
FR 2830589 A1 4/2003
(Continued)

*Primary Examiner* — Sean Gugger

(57) ABSTRACT

A hybrid module for a motor vehicle drive train includes an electric machine, a rotor bearing carrier, a first bearing, a second bearing, and an intermediate shaft. The electric machine has a rotor unit with a rotor. The roller bearing carrier is for rotatably supporting the rotor unit. The intermediate shaft is for transmitting a torque between an internal combustion engine and a transmission or an output. The internal combustion engine and, the transmission or the output, can be connected to the hybrid module. The intermediate shaft is rotatably supported by the first bearing and the second bearing. The first bearing or the second bearing is supported on the rotor bearing carrier, supported or on the rotor unit, or is arranged to be supported on an output shaft of the internal combustion engine.

14 Claims, 5 Drawing Sheets

(51) Int. Cl.
  *B60K 6/30* (2007.10)
  *B60K 6/387* (2007.10)
  *H02K 7/00* (2006.01)
  *H02K 7/08* (2006.01)
  *H02K 7/108* (2006.01)
  *B60K 6/48* (2007.10)

(52) U.S. Cl.
  CPC .............. *H02K 7/006* (2013.01); *H02K 7/088* (2013.01); *H02K 7/108* (2013.01); *B60K 2006/4816* (2013.01); *B60Y 2200/92* (2013.01); *B60Y 2400/162* (2013.01); *B60Y 2400/424* (2013.01)

(56) References Cited

U.S. PATENT DOCUMENTS

2014/0094341 A1* 4/2014 Ruder .................... B60K 6/383
  477/5
2014/0124321 A1* 5/2014 Frait ..................... B60K 6/405
  192/66.3

FOREIGN PATENT DOCUMENTS

WO   2012079697 A1   6/2012
WO   2012083912 A2   6/2012

* cited by examiner

HYBRID MODULE AND A DRIVE ARRANGEMENT FOR A MOTOR VEHICLE

CROSS-REFERENCE TO RELATED APPLICATIONS

This application is the United States National Phase of PCT Appln. No. PCT/DE2017/100337 filed Apr. 25, 2017, which claims priority to German Application Nos. DE102016223135.9 filed Nov. 23, 2016 and 102016207104.1 filed Apr. 27, 2016, the entire disclosures of which are incorporated by reference herein.

TECHNICAL FIELD

The disclosure relates to a hybrid module for a motor vehicle, such as a passenger car, a heavy goods vehicle or some other commercial vehicle, for coupling to a drive unit, e.g., to an internal combustion engine, and a drive arrangement for a motor vehicle having the hybrid module according to the disclosure.

BACKGROUND

Hybrid modules that are currently available, which can combine an electric motor mode with an internal combustion engine mode by coupling an internal combustion engine to a drive train of a vehicle, generally comprise an electric motor, a separating clutch, the actuation system thereof, bearings and housing components, which connect the three main components to form a functional unit. The electric motor allows electric driving, a power boost for the internal combustion engine mode, and energy recovery. The separating clutch and the actuation system thereof provide for the coupling or decoupling of the internal combustion engine.

In the case of motor vehicles that have hybrid systems and, in particular, "P2" hybrid systems, the electric motor and at least one torque transmission element are arranged between the internal combustion engine and the transmission. Moreover, a torsional vibration damping element (e.g., a dual-mass flywheel) and a separating clutch are generally arranged in the power flow between the internal combustion engine and the electric motor, the separating clutch enabling the internal combustion engine to be selected or decoupled. The torque which is produced by the internal combustion engine and/or the electric motor can then be transmitted to the transmission by a further controllable torque transmission element, e.g., a clutch, a dual clutch or a torque converter.

In order to arrange these different units and components in a space-saving way and to connect them to one another functionally, a shaft is arranged as a torque transmission element between the crankshaft of the internal combustion engine and the transmission input shaft in such hybrid systems. This "intermediate shaft" is used to transmit the torque from the internal combustion engine to the transmission when the driving situation requires it. In addition or as an alternative, torque can be transmitted via the intermediate shaft from the electric machine to the internal combustion engine in order to start the latter or to exploit the braking effect thereof using the engine braking principle.

A vehicle having a hybrid module, e.g., having a P2 hybrid module, offers more driving states than a conventional vehicle having an internal combustion engine or a pure electric vehicle. However, it is also necessary for a larger number of parts to be supported rotatably and coupled or decoupled to and from one another in various ways. Therefore, more bearings, in particular rolling bearings, are also used between the internal combustion engine and the transmission in a hybrid module than in conventional vehicles. By virtue of the principle involved, all bearings produce drag losses, which are noticeable from bearing friction in the form of drag torques and heating of the bearing, for example. In hybrid vehicles, it is important, because of the high efficiency requirements, to keep bearing losses as low as possible.

At the same time, the bearings of the intermediate shaft must support and transfer axial and radial forces acting externally on the intermediate shaft, e.g., tilting moments, weight-associated forces and inertia forces, due, for example, to accelerations and gyroscopic forces.

SUMMARY

The features can be combined in any technically appropriate manner, for which purpose reference can also be made to the explanations from the following description and features from the figures, which comprise supplementary embodiments.

In the context of the present disclosure, the terms "radially", "axially" and "circumferential direction" always relate to the axis of rotation of the hybrid module.

The disclosure relates to a hybrid module, in particular a hybrid module for arrangement in a drive train of a motor vehicle. It comprises an electric machine having a rotor unit, which has a rotor of the electric machine, a rotor bearing carrier for providing rotational support for the rotor unit, and an intermediate shaft for transmitting a torque between an internal combustion engine, which can be connected to the hybrid module, (and a transmission or output, which can be connected to the hybrid module), wherein the intermediate shaft is rotatably supported by means of at least one first bearing and one second bearing. At least one of the bearings is supported on the rotor bearing carrier or on the rotor unit or is arranged in such a way that it can be supported on an output shaft of an internal combustion engine which can be coupled to the hybrid module.

The rotor bearing carrier used for rotational support of the rotor is preferably arranged in a fixed manner in relation to a housing of the hybrid module, and therefore the rotor unit and the rotor bearing carrier are designed to be rotatable relative to one another. For this purpose, further bearings that permit rotation may be arranged between the rotor unit and the rotor bearing carrier.

The rotor unit comprises the rotor and therefore it performs the rotary motion of the rotor in the stator. The rotation unit can have various components which are mechanically coupled to the rotor, e.g., components of a friction clutch.

Here, the support should be understood to mean that the force introduced into the bearing by the intermediate shaft is transmitted by this bearing to the relevant component part, which absorbs this force, while there is no intention to exclude the arrangement of conventional intermediate elements, e.g., coatings or spacer elements, from this definition.

One of the first bearing and of the second bearing may have a function of a fixed bearing and another of the first bearing and of the second bearing may have a function of a floating bearing, or one of the first bearing and of the second bearing is a fixed bearing and the other of the first bearing and of the second bearing is a floating bearing.

In an example embodiment, it is envisaged that both bearings are supported on the rotor bearing carrier. In this case, both bearings can be arranged in a bearing subassembly. A bearing subassembly of this kind forms a compact unit which can be fully preassembled. The bearing subassembly can be mounted without the components which subsequently surround it and, without further parts, forms an interconnected subassembly.

In another example embodiment, it is envisaged that the bearing arranged on the connection side of the intermediate shaft for the connection of the internal combustion engine has the function of a fixed bearing. The first bearing can be supported on the rotor bearing carrier, and the second bearing can be supported on the rotor unit. In this case, provision is can be made for a bearing supported on the rotor unit to be embodied as a fixed bearing. However, the present invention is not restricted to this embodiment; instead, this bearing can also be a fixed bearing in special embodiments. Here, a radially inward-leading component part of the rotor unit is used to support the intermediate shaft via the second bearing. This element of the rotor unit is mechanically connected to the rotor.

The hybrid module may comprises a dual clutch device, by means of which torque can be transmitted from the electric machine and/or from a separating clutch of the hybrid module to a drive train, having a first component clutch and a second component clutch.

It is furthermore possible for a component part of the rotor unit to be a separating clutch, by means of which torque made available by an internal combustion engine can be transmitted to the hybrid module and by means of which the hybrid module can be rotationally separated from the internal combustion engine. In this case, the separating clutch comprises a counterplate for the application of a counterforce to the contact pressure force applied by a pressure plate of the separating clutch in order to produce a friction torque at a friction disk of the separating clutch, and the second bearing is supported on the counterplate. The counterplate is thus an element which is firmly connected in terms of rotation to the actual rotor of the electric machine and which is used to support the intermediate shaft.

The hybrid module can furthermore be embodied in such a way that the first bearing is arranged such that it can be supported on an output shaft of an internal combustion engine that can be coupled to the hybrid module, and the second bearing is supported on the rotor unit. Here too, the rotor unit or a radially inward-leading component part of the rotor unit which is connected to the rotor is used to support the intermediate shaft via the second bearing. Another alternative is for the second bearing to be supported on the rotor bearing carrier.

In the last-mentioned embodiments, the first bearing may have the function of a floating bearing, and the second bearing may have the function of a fixed bearing. These bearings may be rolling bearings or a bearing unit having two separate rolling bearing races. The bearing embodied as a fixed bearing can transmit radial and axial forces. The bearing embodied as a floating bearing can transmit only radial forces. In particular, a deep groove ball bearing is provided as a fixed bearing, and a needle bearing is provided as a floating bearing. Alternatively, it is also possible for four-point bearings, self-aligning roller bearings, spherical roller bearings or cylinder roller bearings with a collar on both sides to be used as fixed bearings. In the case of a unilateral axial load or when the axial load in one direction is significantly higher, it is also possible to use angular ball bearings or taper roller bearings as fixed bearings. As floating bearings, it is alternatively possible to use cylinder roller bearings or deep groove ball bearings, four-point bearings, self-aligning roller bearings or spherical roller bearings if one of the bearing rings is secured in an axially movable manner on the component part supporting it.

In another alternative embodiment, it is also possible to use two bearings, which can transmit the radial forces and, in each case, axial forces along just one axial direction. Depending on the axial direction in which the higher forces are acting on the intermediate shaft, the intermediate shaft is then supported axially on the adjacent components by one or the other bearing. Consequently, the bearing, which can absorb a corresponding axial force and consequently prevents axial movement of the intermediate shaft, then serves as a fixed bearing in the direction concerned. As a floating bearing, the other bearing in each case can absorb only radially acting forces and, consequently, can prevent only radial movement of the shaft. Such a bearing arrangement comprising two bearings, which can each transmit only axial forces in one direction, can be embodied using two angular ball bearings, for example, or bearings which are each fixed axially in only one direction on the components adjacent thereto and can be moved out of their set position in the other direction. The embodiment which has the angular ball bearings can be implemented in such a way that each bearing blocks the axial movement of the intermediate shaft in a different direction, ensuring that the intermediate shaft is axially fixed, as in a traditional fixed bearing/floating bearing combination.

The bearings can be provided as grease-lubricated or oil-lubricated bearings and as sealed or unsealed bearings.

In another embodiment of the hybrid module, it is envisaged that the counterplate has, radially on the inside, an opening, the maximum radial extent of which is greater than that of the intermediate shaft, thus allowing the intermediate shaft to be passed through this opening during assembly. This makes it possible to fully assemble the subassembly comprising the rotor of the electric motor, the rotor carrier, the separating clutch and the separating clutch actuation system and to test the functioning of the clutch before the intermediate shaft is installed.

Another aspect of the present disclosure is a drive arrangement for a motor vehicle having an internal combustion engine and a hybrid module according to the invention as well as a transmission. The hybrid module is coupled or can be coupled in a manner fixed in terms of rotation to the internal combustion engine and the transmission. In the case of the arrangement of a bearing of the hybrid module in such a way that it can be supported on an output shaft of an internal combustion engine that can be coupled to the hybrid module, it is supported in the drive train under consideration on the output shaft of the internal combustion engine coupled to the hybrid module.

BRIEF DESCRIPTION OF THE DRAWINGS

The disclosure is explained in detail below against the relevant technical background with reference to the associated drawings, which show example embodiments. The disclosure is not restricted in any way by the purely schematic drawings, and it should be noted that the illustrative embodiments shown in the drawings are not restricted to the dimensions illustrated. In the drawings.

DETAILED DESCRIPTION

Figure 1:
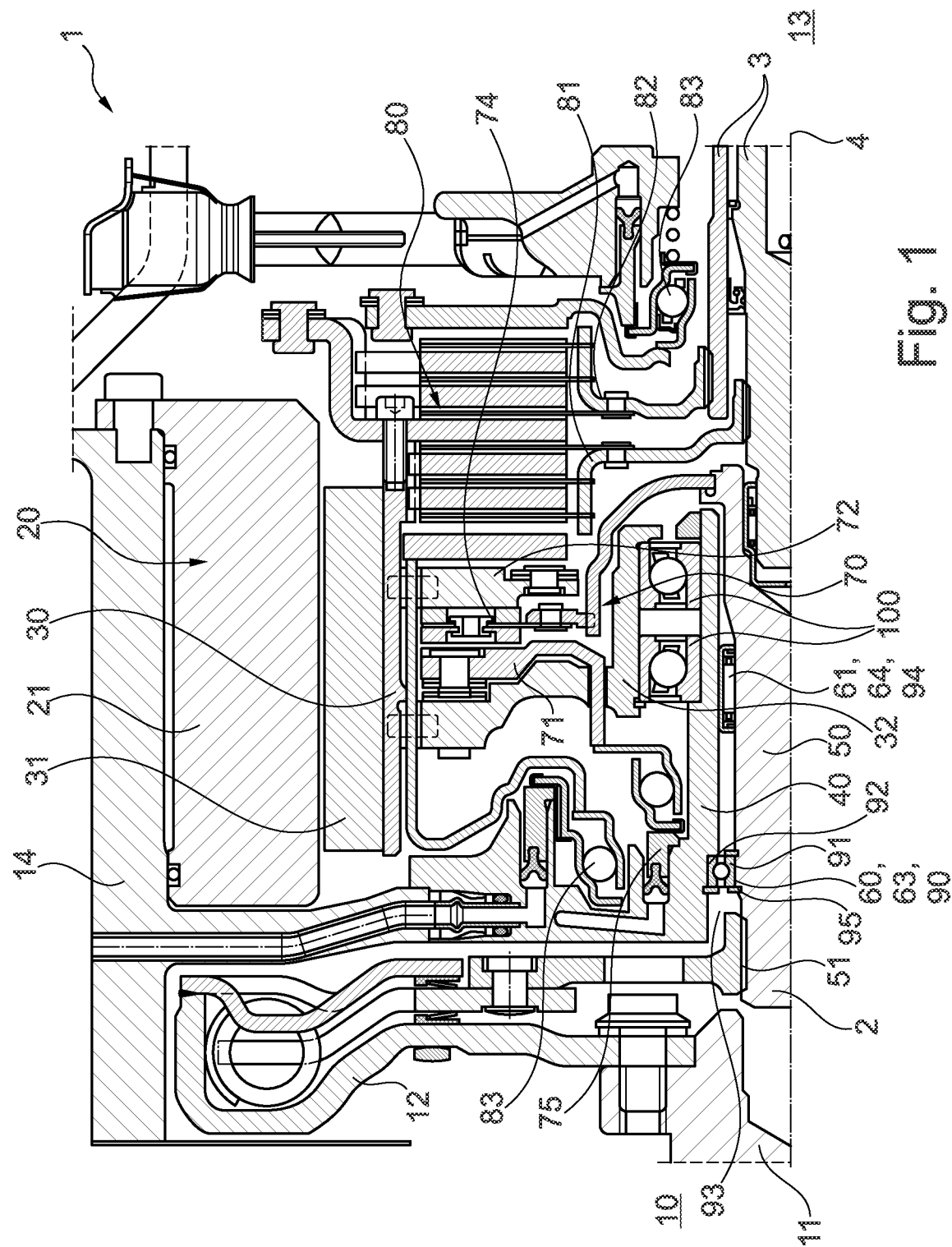
FIG. 1 shows a hybrid module according to a first embodiment.

FIG. 1 shows a hybrid module with a bearing variant for the intermediate shaft 50. The hybrid module 1 comprises an electric machine 20 having a stator 21 and a rotor 31, which is arranged radially on the inside relative to said stator. The rotor 31 is a component part of a rotor unit 30, on which the windings and/or the magnets of the rotor 31 are mounted and which has a radially inward-leading component part 32. The electric machine 20 is accommodated in a housing 14 of the hybrid module 1. In the vicinity of the position of the internal combustion engine 10 there is a set of splines 51, by means of which the intermediate shaft 50 is connected via a drive to the dual-mass flywheel 12, which is in turn coupled to an output shaft 11 of the internal combustion engine.

The rotary motion of the dual-mass flywheel 12 is transmitted to the rotor unit 30 via a separating clutch 70. For this purpose, the separating clutch 70 has a pressure plate 71 and a counterplate 72, which is connected for conjoint rotation to the rotor unit 30.

The rotation of the rotor unit 30 is transmitted to the dual-clutch device 80 and, from there, to an output 3 on the transmission side. For this purpose, the dual-clutch device 80 has a first component clutch 81 and a second component clutch 82.

In the embodiment illustrated in FIG. 1, the intermediate shaft 50 has its smallest shaft diameter in the region facing the internal combustion engine. The subassembly arranged radially to the outside of the intermediate shaft 50, said subassembly comprising the rotor bearing carrier 40 and at least one clutch actuation system 83, has its largest inside diameter on its side facing the internal combustion engine. This radial diameter difference, arising on the side of the intermediate shaft 50 facing the internal combustion engine, of the intermediate shaft 50 and of the radial installation space 93 arising therefrom is used for the arrangement of a fixed bearing 63 embodied as a deep groove ball bearing 90.

The position of the side of the intermediate shaft 50 facing the transmission 13 is used for the arrangement of a needle bearing 94 since the radial installation space 93 between the intermediate shaft 50 and the components adjacent thereto is small there.

The two bearings 60, 61 may be arranged close to the two opposite ends of the intermediate shaft 50. To ensure that the fixed bearing 63 can support axial forces in both directions, both the bearing inner ring 91 and the bearing outer ring 92 rest in both directions against a shoulder or on a fastening element, e.g., in the form of the shaft retaining ring 95 illustrated. In the illustrative embodiment shown in FIG. 1, shaft retaining rings 95 are arranged on both sides of the bearing inner ring 91 of the fixed bearing 63. This allows axial fixing with a minimum radial installation space requirement. As an alternative, however, support for the fixed bearing 63, embodied as a deep groove ball bearing 90, on one side by a shaft shoulder is possible, wherein, in this variant embodiment, the needle bearing diameter should be increased in order to allow assembly.

Figure 2:
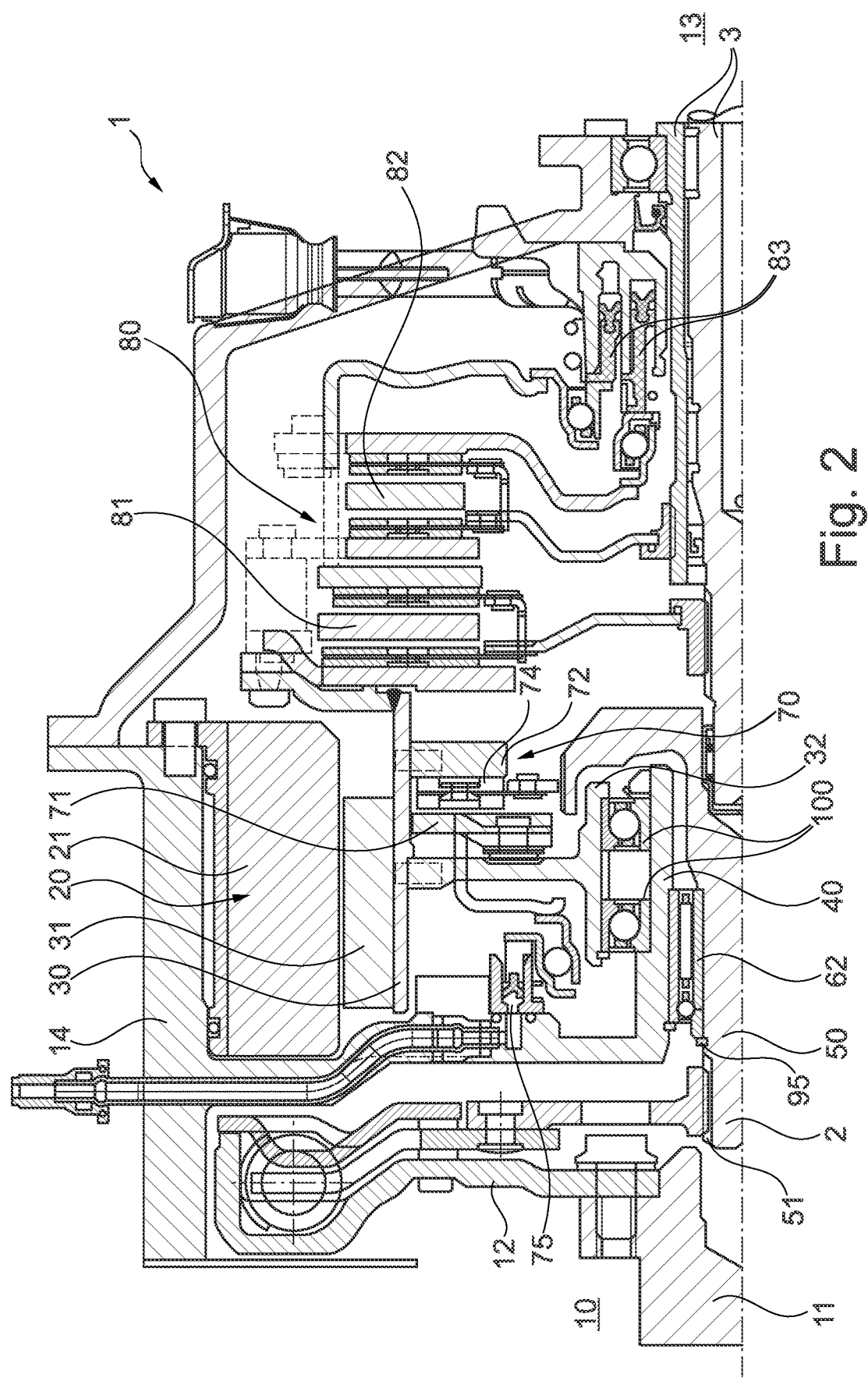
FIG. 2 shows a hybrid module according to a second embodiment.

FIG. 2 shows an embodiment of the hybrid module 1 in which a smaller spacing is implemented between the bearings than is illustrated in FIG. 1. This is implemented by a bearing subassembly 62 which is arranged between the intermediate shaft 50 and the rotor bearing carrier 40. The positions of the bearings illustrated can also be interchanged as a departure from the illustration in FIGS. 1 and 2.

Figure 3:
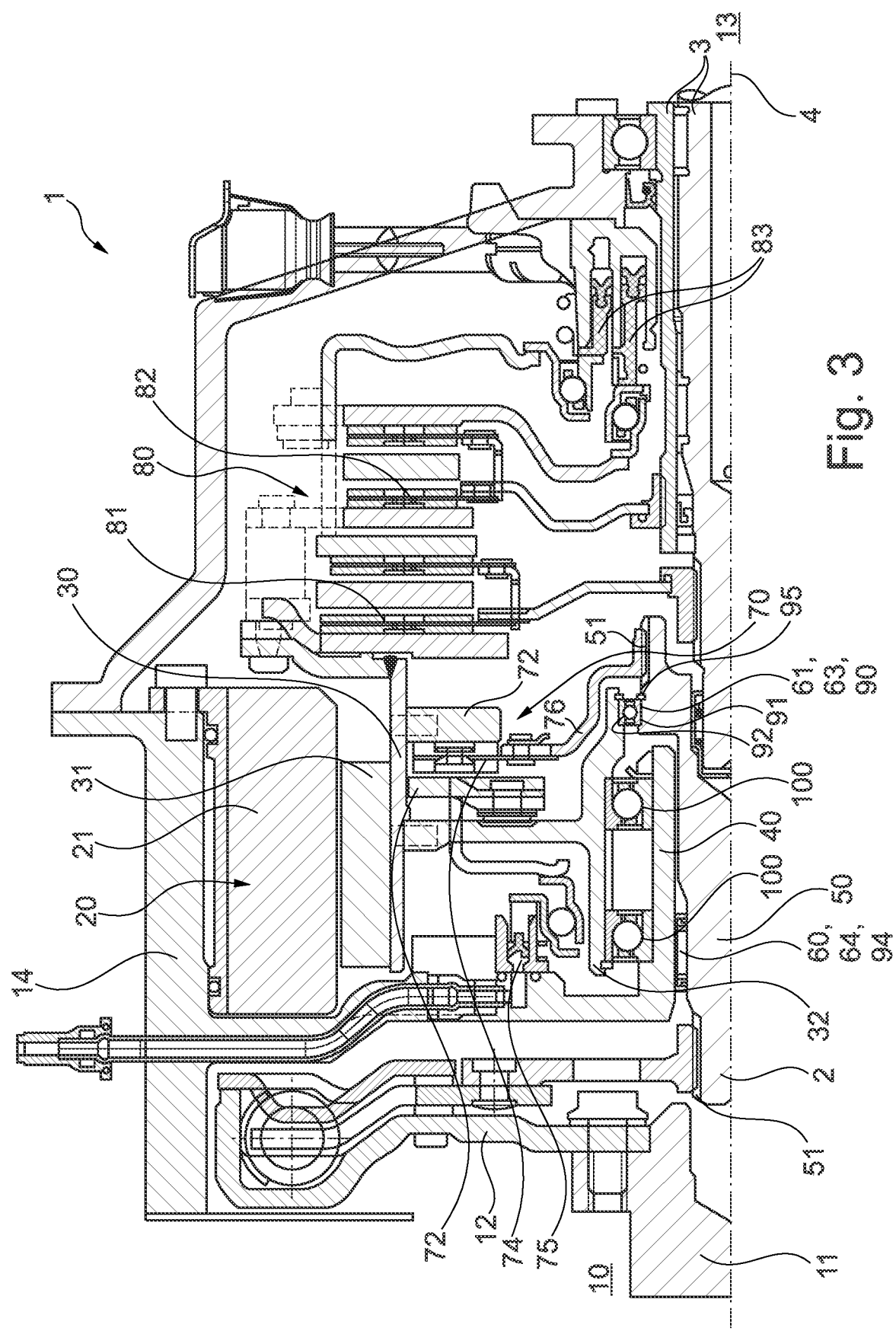
FIG. 3 shows a hybrid module according to a third embodiment.

FIG. 3 shows another bearing concept for the intermediate shaft 50. Here, the bearing which performs the function of a floating bearing 64 is a needle bearing 94 and is arranged on the side of the intermediate shaft 50 facing the internal combustion engine. The fixed bearing 63, which is embodied as a deep groove ball bearing 90, is arranged on the side of the intermediate shaft 50 which faces the transmission. As in the illustrative embodiment shown in FIG. 1, the floating bearing 64 is arranged between the intermediate shaft 50 and the rotationally fixed rotor bearing carrier 40.

Here, however, the fixed bearing 63 is arranged between the intermediate shaft 50 and the rotor 31 of the electric machine 20. Although the fixed bearing 63 has a larger diameter than the illustrative embodiment shown in FIG. 1, this is not disadvantageous since, in the closed state of the separating clutch 70, the intermediate shaft 50 and the rotor 31 of the electric machine 20 rotate at the same speed, and therefore, as a consequence, there is no relative speed and thus also there are no bearing losses in the fixed bearing 63. When considering the entire driving cycle, this compensates for the potentially high losses due to the larger bearing diameter.

In order to keep the diameter small in this arrangement too, the seat of the fixed bearing 63 on the rotor 31 is shifted radially inward to such an extent that the installation of the rotor main bearing 100 is only just possible.

Installation is performed as follows: first of all, the rotor bearing carrier 40 and the rotor 31 are connected to one another by the rotor main bearing 100, here consisting of two angular ball bearings. In this bearing assembly, which should run in a particularly rigid and play-free manner, the bearing play can be adjusted by means of a shaft nut. The installation of the shaft nut is possible since the bearing seat on the rotor 31, which is provided for the as yet uninstalled fixed bearing 63 of the intermediate shaft 50, is so large that the shaft nut can be passed through it and then screwed onto the rotor bearing carrier 40.

After the bearing of the intermediate shaft 50 serving as a floating bearing 64 has been preinstalled on the rotor bearing carrier 40 and the fixed bearing 63 has been preinstalled on the intermediate shaft 50, the intermediate shaft 50 can be inserted into the rotor bearing carrier 40 and fixed axially by securing the fixed bearing 63 on the seat of the rotor 31. In this illustrative embodiment, the seat of the rotor is situated on the radially inward-leading component part 32 of the rotor unit 30.

A separating clutch connecting element 76 of the dividable separating clutch 70 is then mounted on the set of splines 51 of the intermediate shaft 50 and connected to the separating clutch friction disk 74. When the intermediate shaft 50, the separating clutch 70 and the rotor 31 of the electric machine 20 have been assembled to form a structural unit, the main clutch of the hybrid module 1, which can be a dual-clutch device 80 for example, can then be connected to the rotor 31. For this purpose, the illustrative embodiments shown in FIGS. 2 to 5 have easily accessible connection points between the rotor 31 and the clutch.

Figure 4:
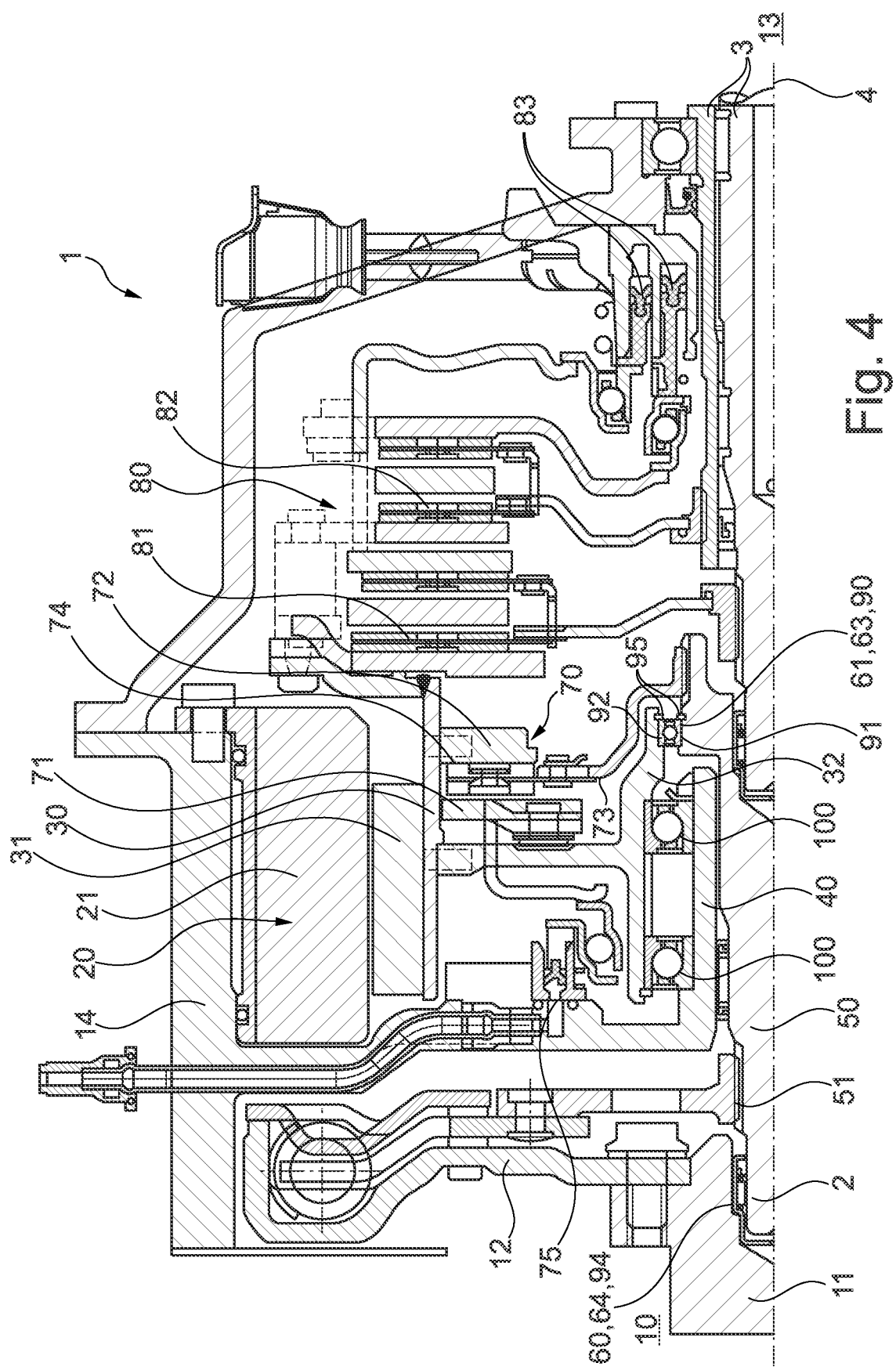
FIG. 4 shows a hybrid module according to a fourth embodiment.

FIG. 4 shows a variant of the illustrative embodiment shown in FIG. 3. Here, however, the bearing serving as a floating bearing 64 is not arranged between the intermediate shaft 50 and the rotor bearing carrier 40, but between the intermediate shaft 50 and the output shaft 11 of the internal combustion engine, which is preferably a crankshaft. This reduces the bearing losses since, apart from the movements of the torsional vibration damper, no relative speed arises between the output shaft 11 of the internal combustion engine and the intermediate shaft 50.

Figure 5:
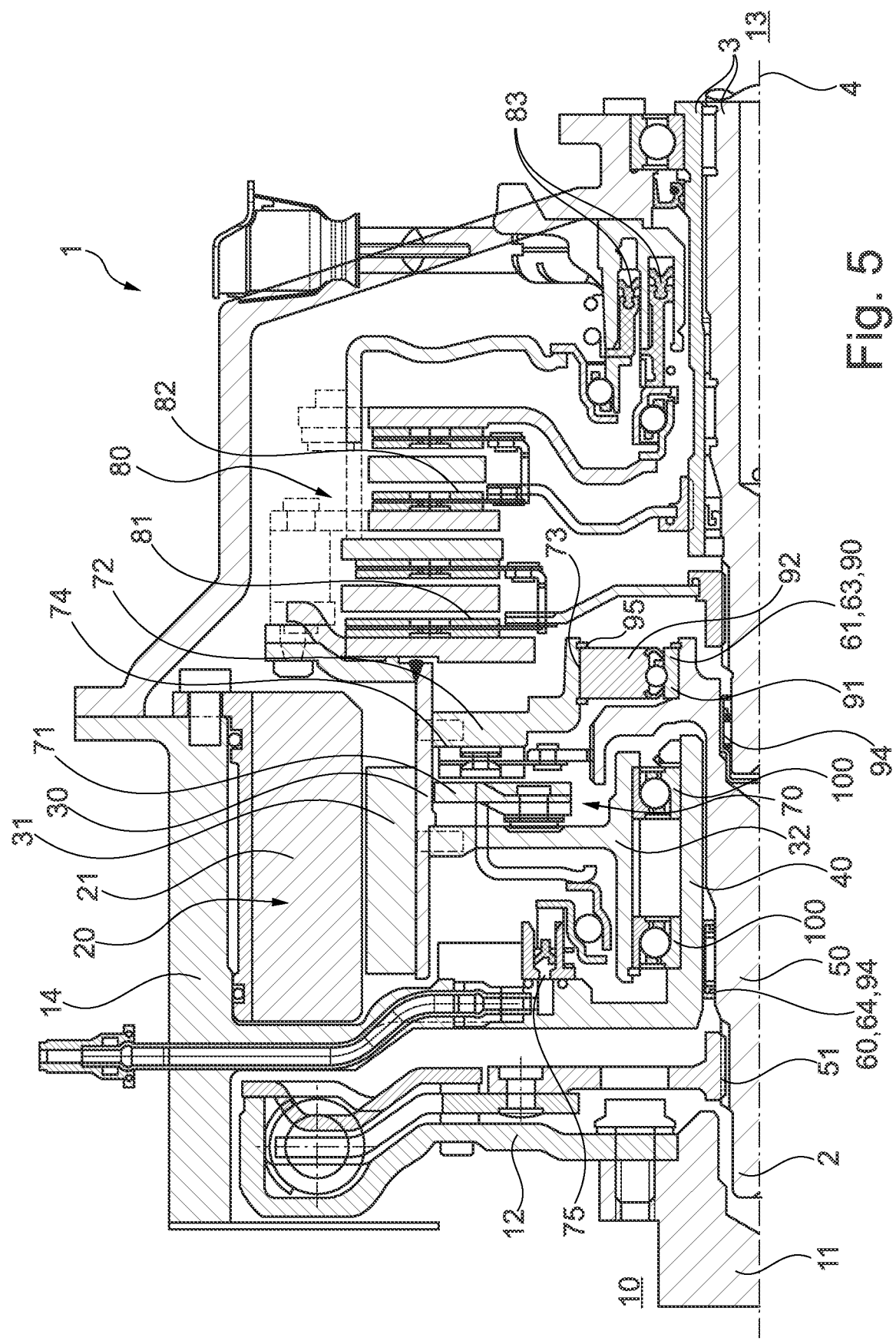
FIG. 5 shows a hybrid module according to a fifth embodiment.

FIG. 5 shows another variant of the hybrid module 1, which is similar to the illustrative embodiment from FIG. 3. In this illustrative embodiment too, the fixed bearing 63 of the intermediate shaft 50 is situated between the intermediate shaft 50 and the rotor 31. Here, however, the fixed bearing 63 is not connected directly to the radially inward-leading component part 32 of the rotor unit 30 but is connected indirectly in a mechanical way to the rotor 31 by means of the counterplate 72 of the separating clutch 70, which is a component part of the rotor unit 30. In this arrangement, assembly is possible even without a dividable separating clutch disk. The fixed bearing 63 is situated on that side of the set of splines connecting the intermediate shaft 50 to the separating clutch disk which faces the transmission. As a result, the separating clutch friction disk 74 does not cover the axial fastening elements of the fixed bearing 63.

In order to minimize the bearing losses of the fixed bearing 63, the bearing race of the fixed bearing 63 lies on a relatively small diameter, despite the large outer fastening diameter between the counterplate 72 and the fixed bearing 63. The large outer fastening diameter of the fixed bearing subassembly offers the advantage that the counterplate 72 has, radially on the inside, an opening 73 of sufficient size to enable the intermediate shaft 50 to be inserted through this opening 73. This makes it possible to fully assemble the subassembly comprising the rotor 31 of the electric motor, the rotor bearing carrier 40, the separating clutch 70 and the separating clutch actuation system 75 and to test the functioning of the clutch before the intermediate shaft 50 is installed.

Alternatively, the inside diameter of the opening 73 of the counterplate 72 is smaller than the outside diameter of the intermediate shaft 50, thereby making it possible to fasten the counterplate 72 on the rotor 31 only after the insertion of the intermediate shaft 50. In the illustrative embodiment shown in FIG. 5, the large outside fastening diameter of the fixed bearing subassembly is made possible by a bearing outer ring 92 of the fixed bearing which is very thick in the radial direction. Alternatively, a further component part can also be inserted between the fixed bearing 63 and the counterplate 72 in order to bridge the radial spacing and connect the two component parts to one another.

The possibility of shifting the bearing race radially inward by means of a thick bearing outer ring 92 or an intermediate component, despite a significantly larger outer bearing fastening diameter predetermined by the assembly concept, can also be used in the illustrative embodiments shown in FIGS. 3 and 4 to reduce the bearing losses.

Likewise as an addition or as an alternative, adjacent component parts can be supported or mounted on the intermediate shaft 50. In the embodiments illustrated in the figures, this is illustrated by way of example for a transmission input shaft, which is supported on the intermediate shaft 50 by means of a floating bearing 64 embodied as a needle bearing 94.

The embodiments of the fixed bearing 63 and the floating bearing 64 which are presented in the various illustrative embodiments and the connections of said bearings can also be combined with one another in any desired manner.

The hybrid module according to the disclosure is embodied with different bearing arrangements for the intermediate shaft which are distinguished by compact construction and low bearing losses produced by drag torques since the embodiment according to the invention of the hybrid module makes it possible to embody the bearings with very small radial dimensions and, consequently, to arrange them with a minimum radial spacing with respect to the axis of rotation of the intermediate shaft.

REFERENCE LABELS

1 hybrid module
2 input
3 output
4 axis of rotation
10 position of the internal combustion engine
11 output shaft of the internal combustion engine
12 dual-mass flywheel
13 position of the transmission
14 housing
20 electric machine
21 stator
30 rotor unit
31 rotor
32 radially inward-leading component part
40 rotor bearing carrier
50 intermediate shaft
51 set of splines
60 first bearing
61 second bearing
62 bearing subassembly
63 fixed bearing
64 floating bearing
70 separating clutch
71 pressure plate
72 counterplate
73 opening
74 separating clutch friction disk
75 separating clutch actuation system
76 separating clutch connecting element
80 dual-clutch device
81 first component clutch
82 second component clutch
83 clutch actuation system
90 deep groove ball bearing
91 bearing inner ring
92 bearing outer ring
93 radial installation space
94 needle bearing
95 shaft retaining ring
100 rotor main bearing

The invention claimed is:

1. A hybrid module for a motor vehicle drive train comprising:
   an electric machine comprising a rotor unit with a rotor;
   a rotationally-fixed rotor bearing carrier for rotatably supporting the rotor unit;
   a first bearing;
   a second bearing;
   a third bearing arranged axially between the first bearing and the second bearing; and,
   an intermediate shaft for transmitting a torque between an internal combustion engine and a transmission or an output, wherein:
   the internal combustion engine and, the transmission or the output, can be connected to the hybrid module;
   the intermediate shaft is rotatably supported by the first bearing and the second bearing;
   the first bearing is supported on the rotor bearing carrier;
   the second bearing is supported on the rotor unit; and the third bearing supports the rotor unit on the rotor bearing carrier.

2. The hybrid module of claim 1,
a one of the first bearing or the second bearing is a fixed bearing; and,
the other of the first bearing or the second bearing is a floating bearing.

3. The hybrid module of claim 2, wherein:
the first bearing is a floating bearing; and,
the second bearing is a fixed bearing.

4. The hybrid module of claim 3, wherein:
the rotor unit comprises a separating clutch for:
 transmitting a torque from the internal combustion engine to the electric machine; and,
 separating the electric machine from the internal combustion engine;
the separating clutch comprises a counterplate, a pressure plate, and a friction disk;
the counterplate is for applying a counterforce to a contact pressure force applied by the pressure plate to transmit a friction torque to the friction disk; and,
the second bearing is supported on the counterplate.

5. The hybrid module of claim 4, wherein:
the counterplate has an opening with a first maximum radius;
the intermediate shaft has a second radius; and,
the first maximum radius is greater than the second radius thus allowing the intermediate shaft to be passed through the opening during assembly.

6. A hybrid module for a vehicle comprising:
a housing;
an electric machine comprising a stator fixed to the housing, and a rotor;
a rotor bearing carrier fixed to the housing;
an intermediate shaft for coupling to an output shaft of an internal combustion engine;
a separating clutch for selectively coupling the intermediate shaft with the rotor;
a first bearing in direct contact with the rotor bearing carrier and the intermediate shaft; and,
a second bearing in direct contact with the rotor bearing carrier and the intermediate shaft.

7. The hybrid module of claim 6 further comprising a dual mass flywheel drivingly connected to the intermediate shaft and couplable to the output shaft.

8. The hybrid module of claim 6 wherein:
the intermediate shaft comprises a connection side proximate the internal combustion engine; the first bearing is a fixed, deep groove ball bearing on the connection side; and, the second bearing is a floating, needle bearing.

9. The hybrid module of claim 6 wherein the first bearing and the second bearing are installed between the intermediate shaft and the rotor bearing carrier.

10. The hybrid module of claim 6 further comprising a second bearing, wherein:
the rotor comprises a radially inward leading component part; and,
the second bearing contacts the radially inward leading component part and the intermediate shaft.

11. The hybrid module of claim 10 further comprising a third bearing installed on the intermediate shaft for positioning the intermediate shaft in the output shaft.

12. The hybrid module of claim 6 further comprising a second bearing, wherein:
the separating clutch comprises a counterplate mechanically connected to the rotor; and,
the second bearing contacts the counterplate and the intermediate shaft.

13. The hybrid module of claim 12 wherein:
the intermediate shaft comprises a spline with a first outer diameter;
the separating clutch comprises a friction disk connected to the intermediate shaft at the spline; and,
the second bearing comprises a second outer diameter, greater than the first outer diameter.

14. The hybrid module of claim 6 further comprising a dual-clutch device connected to the rotor by accessible connection points.

\* \* \* \* \*